US010478918B2

(12) United States Patent
Miura et al.

(10) Patent No.: US 10,478,918 B2
(45) Date of Patent: Nov. 19, 2019

(54) METHOD FOR MANUFACTURING OPTICAL FILM

(71) Applicant: ZEON CORPORATION, Chiyoda-ku, Tokyo (JP)

(72) Inventors: Takuya Miura, Tokyo (JP); Masaya Hirano, Tokyo (JP)

(73) Assignee: ZEON CORPORATION, Chiyoda-ku, Tokyo (JP)

(*) Notice: Subject to any disclaimer, the term of this patent is extended or adjusted under 35 U.S.C. 154(b) by 191 days.

(21) Appl. No.: 15/527,446

(22) PCT Filed: Nov. 16, 2015

(86) PCT No.: PCT/JP2015/082128
§ 371 (c)(1),
(2) Date: May 17, 2017

(87) PCT Pub. No.: WO2016/080347
PCT Pub. Date: May 26, 2016

(65) Prior Publication Data
US 2017/0326683 A1 Nov. 16, 2017

(30) Foreign Application Priority Data

Nov. 20, 2014 (JP) .................................. 2014-235727

(51) Int. Cl.
*B23K 26/073* (2006.01)
*B23K 26/38* (2014.01)
(Continued)

(52) U.S. Cl.
CPC ........ *B23K 26/073* (2013.01); *B23K 26/0622* (2015.10); *B23K 26/38* (2013.01);
(Continued)

(58) Field of Classification Search
CPC .. B23K 26/073; B23K 26/0622; B23K 26/38; G02B 27/0927; G02B 1/00; G02B 5/3033
See application file for complete search history.

(56) References Cited

U.S. PATENT DOCUMENTS 5,925,271 A * 7/1999 Pollack .................. B23K 26/02
219/121.74
6,433,301 B1 * 8/2002 Dunsky ................ B23K 26/073
219/121.67

(Continued)

FOREIGN PATENT DOCUMENTS

JP 2004042140 A 2/2004
JP 2006307057 A 11/2006

(Continued)

OTHER PUBLICATIONS

May 23, 2017, International Preliminary Report on Patentability issued in the International Patent Application No. PCT/JP2015/082128.

(Continued)

Primary Examiner — Matthew W Jellett
(74) Attorney, Agent, or Firm — Kenja IP Law PC (57) ABSTRACT

A method for producing an optical film including a cutting step of performing irradiation with a laser light onto a layered body having a glass support and a resin layer provided on the support to cut the resin layer, wherein in the cutting step, the irradiation with the laser light is performed such that a beam of the laser light has a flat energy distribution, and a distance between a focus of the laser light and a receiving point of the laser light on a surface of the resin layer where the laser light is received or a ratio P/V of an output P of the laser light relative to a scanning speed V is in a specific range.

5 Claims, 3 Drawing Sheets

(51) Int. Cl.
*B23K 26/0622* (2014.01)
*G02B 1/00* (2006.01)
*G02B 27/09* (2006.01)
*G02B 5/30* (2006.01)

(52) U.S. Cl.
CPC ............ *G02B 1/00* (2013.01); *G02B 27/0927* (2013.01); *G02B 5/3033* (2013.01)

(56) References Cited

U.S. PATENT DOCUMENTS

| | | | | |
|---|---|---|---|---|
| 6,791,060 | B2 * | 9/2004 | Dunsky | B23K 26/0732 |
| | | | | 219/121.7 |
| 6,804,269 | B2 * | 10/2004 | Lizotte | B23K 26/0608 |
| | | | | 372/100 |
| 6,884,962 | B2 * | 4/2005 | Lizotte | B23K 26/0734 |
| | | | | 219/121.7 |
| 6,909,735 | B2 * | 6/2005 | Lizotte | B23K 26/067 |
| | | | | 359/225.1 |
| 7,773,315 | B2 * | 8/2010 | Fuse | B23K 26/0732 |
| | | | | 359/754 |
| 8,378,258 | B2 * | 2/2013 | Sercel | B23K 26/0732 |
| | | | | 219/121.69 |
| 2010/0028606 | A1 | 2/2010 | Nishida et al. | |
| 2010/0243626 | A1 | 9/2010 | Baldwin | |
| 2014/0373485 | A1 | 12/2014 | Okada et al. | |
| 2016/0020426 | A1 | 1/2016 | Aoyama et al. | |
| 2018/0361503 | A1 * | 12/2018 | Ito | B23K 26/0006 |

FOREIGN PATENT DOCUMENTS

| | | |
|---|---|---|
| JP | 2012521890 A | 9/2012 |
| JP | 2014060392 A | 4/2014 |
| JP | 2014151920 A | 8/2014 |
| JP | 2014197119 A | 10/2014 |
| TW | 200827080 A | 7/2008 |
| WO | 2014097885 A1 | 6/2014 |
| WO | 2014156555 A1 | 10/2014 |

OTHER PUBLICATIONS

Dec. 15, 2015, International Search Report issued in the International Patent Application No. PCT/JP2015/082128.

* cited by examiner

FIG.1

METHOD FOR MANUFACTURING OPTICAL FILM

FIELD

The present invention relates to a method for producing an optical film.

BACKGROUND

A display device such as a liquid crystal display device and an organic electroluminescent display device may be provided with an optical film formed from a resin. Such an optical film is usually formed so as to have a size larger than that of a film piece which is a final product. The film is cut into a desired shape which is matched to a rectangular display face of the display device to obtain a film piece, and the obtained film piece is provided in the display device.

Examples of a method for cutting the film into a desired shape may include a mechanical cutting method using a knife and a laser cutting method using laser light. Of these methods, the laser cutting method is preferable as the method is less likely to generate cut chips.

Such a production method is used in, for example, production of a polarizing plate. In the production, a layered body having a support made of glass and a resin layer, such as a polarizer, provided on the support is prepared, and the resin layer in the layered body is cut using laser light into a desired shape which is matched to a rectangular display face of a display device. The cut resin layer is provided in the display device as a polarizing plate. The support may be removed from the polarizing plate and used again in the next production, and may also be incorporated in the display device in combination with the polarizing plate as a part of component of the display device.

The energy distribution of a beam of the laser light used in the cutting method is generally in a state which is called Gaussian mode. The beam in the Gaussian mode is in a state where the energy is high at an optical axis which is a center of the beam and the energy is low at a position apart from the optical axis. On the other hand, use of a beam having a flat energy distribution, the shape of which is called top hat profile, is also known in order to perform precise cutting (Patent Literatures 1 and 2).

CITATION LIST

Patent Literature

Patent Literature 1: Japanese Patent Application Laid-Open No. 2004-42140 A

Patent Literature 2: Japanese Translation of PCT International Application Publication No. 2012-521890 A (corresponding foreign publication: U.S. Patent Application Publication No. 2010/243626)

SUMMARY

Technical Problem

When the output of the laser light is too low in the laser cutting method, cutting is not smoothly performed. In contrast, when the output of the laser light is increased so that cutting is smoothly performed, a support may be damaged, scratched, or broken. Therefore, a method for producing an optical film which can smoothly perform cutting without causing damage to the support is required.

Therefore, an object of the present invention is to provide a method for producing an optical film which can smoothly perform cutting of a resin layer without causing damage to a support.

Solution to Problem

The present inventor has conducted studies to solve the aforementioned problems. As a result, the inventor has found that when a beam having a flat energy distribution is used as a beam in a laser cutting method and the irradiation with the beam is performed in a specific manner, a resin layer can be favorably cut without causing damage to a support. The present invention has thus been completed.

Accordingly, the present invention provides the following [1] to [6].

(1) A method for producing an optical film comprising a cutting step of performing irradiation with a laser light onto a layered body having a support and a resin layer provided on the support to cut the resin layer, wherein in the cutting step, the irradiation with the laser light is performed such that a beam of the laser light has a flat energy distribution, and a distance between a focus of the laser light and a receiving point of the laser light on a surface of the resin layer where the laser light is received is 0.1 to 1 mm.

(2) A method for producing an optical film comprising a cutting step of performing irradiation with a laser light onto a layered body having a support and a resin layer provided on the support to cut the resin layer, wherein in the cutting step, the irradiation with the laser light is performed such that a beam of the laser light has a flat energy distribution, and a ratio P/V of an output P (W) of the laser light relative to a scanning speed V (mm/s) is 0.10 or more and 0.25 or less.

(3) The method for producing an optical film according to (1), wherein in the cutting step, the irradiation with the laser light is performed such that a ratio P/V of an output P (W) of the laser light relative to a scanning speed V (mm/s) is 0.10 or more and 0.25 or less.

(4) The method for producing an optical film according to any one of (1) to (3), wherein the laser light has a wavelength of 9 µm or more and 9.5 µm or less.

(5) The method for producing an optical film according to any one of (1) to (4), wherein the resin layer contains one or more cyclic olefin resin layers.

(6) The method for producing an optical film according to any one of (1) to (5), wherein the resin layer contains one or more polarizer layers.

Advantageous Effects of Invention

According to the method for producing an optical film of the present invention, a resin layer can be smoothly cut without causing damage to a support, and as a result, a high-quality optical film polarizing plate can be efficiently produced.

DESCRIPTION OF EMBODIMENTS

Hereinafter, the present invention will be described in detail with reference of embodiments and examples, but the present invention is not limited to the following embodiments and examples. The present invention may be freely modified and practiced without departing from the scope of claims of the present invention and their equivalents.

Unless otherwise specified, a direction of a beam and a member used in a step which is "orthogonal" or "horizontal" in this application may include an error within a range which does not impair the effects of the present invention, for example, usually within a range of ±50, preferably ±20, and more preferably ±1°.

[1. Summary: Method for Producing Optical Film]

The method for producing an optical film of the present invention includes a cutting step of performing irradiation with a laser light onto a specific layered body to cut a resin layer in the layered body.

[2. Layered Body]

The layered body used in the method for producing an optical film of the present invention has a support and the resin layer provided on the support. In the following description, this specific resin layer is referred to as "resin layer A".

[2.1. Support]

Examples of a material constituting the support may include a glass, a resin, and a metal. Specific examples of the glass may include soda glass, lead glass, borosilicate glass, alkali-free glass, quartz glass, and chemically strengthened glass. Examples of the resin may include a resin that may have heat resistance such as a polyimide resin and a polyethylene naphthalate resin. Examples of the metal may include aluminum and stainless steel.

The thickness of the support is not particularly limited, and a thickness suitable to perform the method of the present invention may be appropriately selected. For example, in a case of a glass support, the thickness thereof is preferably 0.3 mm or more, and more preferably 0.5 mm or more, and is preferably 1.3 mm or less, and more preferably 1.1 mm or less. In a case of a resin support, the thickness thereof is preferably 0.005 mm or more, and more preferably 0.01 mm or more, and is preferably 0.2 mm or less, and more preferably 0.1 mm or less. In a case of a metal support, the thickness thereof is preferably 0.005 mm or more, and more preferably 0.01 mm or more, and is preferably 2.0 mm or less, and more preferably 1.0 mm or less.

[2.2. Resin Layer A]

The resin layer A contains a resin as a main component, and is a layer which is to be cut in the cutting step in the method for producing an optical film of the present invention. The resin layer A may be a single layer, and may also include a plurality of layers. In a preferable aspect, the resin layer A contains a polarizer layer functioning as a polarizer. In this case, a polarizing plate having a desired shape can be produced by the production method of the present invention. The resin layer A may also contain a transparent resin layer which may function as a polarizer protective layer.

[2.2.1. Polarizer Layer]

Examples of the polarizer layer may include a film obtained by giving appropriate treatments in an appropriate order by an appropriate process to an appropriate vinyl alcohol-based polymer. Examples of the vinyl alcohol-based polymer may include polyvinyl alcohol and partially formalized polyvinyl alcohol. Examples of the treatments for the vinyl alcohol-based polymer may include a dyeing treatment with a dichroic substance such as iodine and a dichroic dye, a stretching treatment, a crosslinking treatment, and combinations thereof. In particular, a polarizer layer formed from a polyvinyl alcohol resin film containing polyvinyl alcohol is preferable. When natural light enters such a polarizer layer, the layer may allow linearly polarized light to pass therethrough. A polarizer layer having excellent light transmittance and degree of polarization is particularly preferable. The thickness of the polarizer layer is generally 5 μm to 80 μm, but is not limited thereto.

[2.2.2. Transparent Resin Layer]

As the resin constituting the transparent resin layer, any resin usable as a layer for protecting a polarizer in a polarizing plate may be used. The resin may be appropriately selected from resins having excellent performances such as transparency, mechanical strength, thermal stability, and water shielding properties. Examples of the resin may include an acetate resin such as triacetyl cellulose, a polyester resin, a polyether sulfone resin, a polycarbonate resin, a polyamide resin, a polyimide resin, a polyolefin resin, a cyclic olefin resin, and a (meth)acrylic resin. Of these, an acetate resin, a cyclic olefin resin, and a (meth)acrylic resin are preferable since the birefringence is small. A cyclic olefin resin is particularly preferable from the viewpoints of transparency, low hygroscopicity, size stability, and lightweight properties.

[2.2.3. Olefin Resin Layer]

In a preferable aspect, one or more transparent resin layers in the resin layer A are an olefin resin layer. The olefin resin layer is a layer of a cyclic olefin resin containing a cyclic olefin polymer. The olefin resin layer is useful as the polarizer protective layer from a variety of viewpoints of transparency, low hygroscopicity, size stability, and lightweight properties. However, since an olefin resin causes a low laser light absorption, it is difficult to favorably cut the olefin resin layer using the laser light without causing damage to the support. When the resin layer A containing the olefin resin layer is subjected to the production method of the present invention, favorable cutting with the laser light can be smoothly performed while enjoying benefit of useful performances of the olefin resin.

[2.2.4. Cyclic Olefin Polymer]

The cyclic olefin polymer is a polymer having an alicyclic structure as a structural unit of the polymer. A resin containing such a cyclic olefin polymer usually exerts excellent performances such as transparency, size stability, phase difference expressing properties, and moldability at low temperatures.

The cyclic olefin polymer may be a polymer having an alicyclic structure in a main chain, a polymer having an alicyclic structure in a side chain, a polymer having an alicyclic structure in main and side chains, or a mixture of two or more thereof at any ratio. In particular, a polymer having an alicyclic structure in a main chain is preferable from the viewpoints of mechanical strength and heat resistance.

Examples of the alicyclic structure may include a saturated alicyclic hydrocarbon (cycloalkane) structure and an unsaturated alicyclic hydrocarbon (cycloalkene or cycloalkyne) structure. Of these, a cycloalkane structure and a cycloalkene structure are preferable from the viewpoints of mechanical strength and heat resistance, and a cycloalkane structure is particularly preferable.

The number of carbon atoms constituting one alicyclic structure is preferably 4 or more, and more preferably 5 or more, and is preferably 30 or less, more preferably 20 or less, and particularly preferably 15 or less. When the number of carbon atom constituting the alicyclic structure falls within this range, mechanical strength, heat resistance, and moldability of the cyclic olefin resin are highly balanced.

The ratio of the structural unit having an alicyclic structure in the cyclic olefin polymer may be selected depending on the purposes of use of a product obtained. The ratio of the structural unit having an alicyclic structure in the cyclic olefin polymer is preferably 55% by weight or more, more preferably 70% by weight or more, and particularly preferably 90% by weight or more. When the ratio of the structural unit having an alicyclic structure in the cyclic olefin polymer falls within in this range, the transparency and heat resistance of the cyclic olefin resin are improved.

Among the cyclic olefin polymers, a cycloolefin polymer is preferable. The cycloolefin polymer is a polymer having a structure obtained by polymerization of a cycloolefin monomer. The cycloolefin monomer is a compound having a ring structure consisting of carbon atoms and also having a polymerizable carbon-carbon double bond in the ring structure. Examples of the polymerizable carbon-carbon double bond may include a carbon-carbon double bond which is capable of achieving polymerization such as ring-opening polymerization. Examples of the ring structure of the cycloolefin monomer may include monocyclic, polycyclic, condensed polycyclic, and crosslinked cyclic structures, and a polycyclic structure obtained by combination thereof. Of these, a polycyclic cycloolefin monomer is preferable since properties, such as dielectric properties and heat resistance, of a polymer to be obtained are highly balanced.

Preferable examples of the cycloolefin polymer may include a norbornene-based polymer, a monocyclic olefin polymer, a cyclic conjugated diene polymer, and a hydrogenated product thereof. Of these, a norbornene-based polymer is particularly suitable since it has good moldability.

Examples of the norbornene-based polymer may include a ring-opened polymer of a monomer having a norbornene structure, and a hydrogenated product thereof; and an addition polymer of a monomer having a norbornene structure, and a hydrogenated product thereof. Examples of the ring-opened polymer of a monomer having a norbornene structure may include a ring-opening homopolymer of one type of monomer having a norbornene structure, a ring-opening copolymer of two or more types of monomers having a norbornene structure, and a ring-opening copolymer of a monomer having a norbornene structure with another monomer copolymerizable with the monomer. Examples of the addition polymer of a monomer having a norbornene structure may include an addition homopolymer of one type of monomer having a norbornene structure, an addition copolymer of two or more types of monomers having a norbornene structure, and an addition copolymer of a monomer having a norbornene structure with another monomer copolymerizable with the monomer. Of these, the hydrogenated product of the ring-opened polymer of a monomer having a norbornene structure is particularly suitable from the viewpoints of moldability, heat resistance, low hygroscopicity, size stability, and lightweight properties.

Examples of the monomer having a norbornene structure may include bicyclo[2.2.1]hept-2-ene (common name: norbornene), tricyclo[4.3.0.1$^{2,5}$]deca-3,7-diene (common name: dicyclopentadiene), 7,8-benzotricyclo[4.3.0.1$^{2,5}$]dec-3-ene (common name: methanotetrahydrofluorene), tetracyclo[4.4.0.1$^{2,5}$.1$^{7,10}$]dodec-3-ene (common name: tetracyclododecene), and derivatives of these compounds (for example, those having a substituent on a ring). Examples of the substituent herein may include an alkyl group, an alkylene group, and a polar group. A plurality of substituents, which may be the same or different, may be bonded to a ring. As the monomer having a norbornene structure, one type thereof may be solely used, and two or more types thereof may also be used in combination at any ratio.

Examples of the polar group may include a heteroatom and an atomic group having a heteroatom. Examples of the heteroatom may include an oxygen atom, a nitrogen atom, a sulfur atom, a silicon atom, and a halogen atom. Specific examples of the polar group may include a carboxyl group, a carbonyloxycarbonyl group, an epoxy group, a hydroxyl group, an oxy group, an ester group, a silanol group, a silyl group, an amino group, an amido group, an imido group, a nitrile group, and a sulfonic acid group.

Examples of the monomer ring-opening copolymerizable with the monomer having a norbornene structure may include monocyclic olefins, such as cyclohexene, cycloheptene, and cyclooctene, and a derivative thereof; and a cyclic conjugated diene such as cyclohexadiene and cycloheptadiene, and a derivative thereof. As the monomer ring-opening copolymerizable with the monomer having a norbornene structure, one type thereof may be solely used, and two or more types thereof may also be used in combination at any ratio.

The ring-opened polymer of the monomer having a norbornene structure may be produced by, for example, polymerization or copolymerization of the monomer in the presence of a ring-opening polymerization catalyst.

Examples of the monomer addition copolymerizable with the monomer having a norbornene structure may include an α-olefin having 2 to 20 carbon atoms, such as ethylene, propylene, and 1-butene, and a derivative thereof; a cycloolefin, such as cyclobutene, cyclopentene, and cyclohexene, and a derivative thereof; and a non-conjugated diene such as 1,4-hexadiene, 4-methyl-1,4-hexadiene, and 5-methyl-1,4-hexadiene. Of these, an α-olefin is preferable, and ethylene is more preferable. As the monomer addition copolymerizable with the monomer having a norbornene structure, one type thereof may be solely used, and two or more types thereof may also be used in combination at any ratio.

The addition polymer of the monomer having a norbornene structure may be produced by, for example, polymerization or copolymerization of the monomer in the presence of an addition polymerization catalyst.

The hydrogenated products of the ring-opened polymer and the addition polymer described above may be produced by, for example, hydrogenation of a carbon-carbon unsaturated bond at a ratio of preferably 90% or more in a solution of the ring-opened polymer and the addition polymer. The hydrogenation may be performed in the presence of a hydrogenation catalyst containing a transition metal, such as nickel and palladium.

Of the norbornene-based polymers, a norbornene-based polymer having as structural units an X: bicyclo[3.3.0]octane-2,4-diyl-ethylene structure and a Y: tricyclo[4.3.0.1$^{2,5}$]decane-7,9-diyl-ethylene structure, wherein the amount of the structural units relative to the total amount of the structural units in the norbornene-based polymer is 90% by weight or more, and the ratio by weight of X relative to Y, X:Y, is 100:0 to 40:60 is preferable. When such a polymer is used, the olefin resin layer containing the norbornene-based polymer can be a layer that does not cause size alteration over a long period of time, and that has an excellent stability in optical characteristics.

Examples of the monocyclic olefin-based polymer may include an addition polymer of a monocyclic olefin-based monomer, such as cyclohexene, cycloheptene, and cyclooctene.

Examples of the cyclic conjugated diene-based polymer may include a polymer obtained by a cyclization reaction of an addition polymer of a conjugated diene monomer, such as 1,3-butadiene, isoprene, and chloroprene; 1,2- and 1,4-addition polymers of a cyclic conjugated diene-based monomer, such as cyclopentadiene and cyclohexadiene; and hydrogenated products thereof.

It is preferable that the molecule of the aforementioned cyclic olefin polymer does not contain a polar group. The cyclic olefin polymer containing no polar group in the molecule generally has a tendency of insufficiency in absorbing, particularly, carbon dioxide gas laser light. However, according to the production method of the present invention, the resin layer A containing such a cyclic olefin polymer containing no polar group in the molecule can also be easily cut using laser light. Further, by the contribution of use of the cyclic olefin polymer containing no polar group in the molecule, the water absorption properties of the transparent resin layer in a polarizing plate obtained can be reduced.

The weight-average molecular weight (Mw) of the cyclic olefin polymer may be appropriately selected depending on the purposes of use of the product obtained, and is preferably 10,000 or more, more preferably 15,000 or more, and particularly preferably 20,000 or more, and is preferably 100,000 or less, more preferably 80,000 or less, and particularly preferably 50,000 or less. When the weight-average molecular weight falls within such a range, the mechanical strength and molding processability of the transparent resin layer in the product obtained are highly balanced. Herein, the weight-average molecular weight is a weight-average molecular weight measured in terms of polyisoprene or polystyrene by gel permeation chromatography using cyclohexane as a solvent (however, toluene may be used when a sample is not dissolved in cyclohexane).

The molecular weight distribution (weight-average molecular weight (Mw)/number-average molecular weight (Mn)) of the cyclic olefin polymer is preferably 1.2 or more, more preferably 1.5 or more, and particularly preferably 1.8 or more, and is preferably 3.5 or less, more preferably 3.0 or less, and particularly preferably 2.7 or less. When the molecular weight distribution is equal to or more than the lower limit value, the productivity of the polymer can be enhanced, and a production cost can be decreased. When it is equal to or less than the upper limit value, the amount of low-molecular weight components is decreased. Therefore, relaxation during high-temperature exposure can be suppressed, and the stability of the transparent resin layer can be enhanced.

The ratio of the cyclic olefin polymer in the olefin resin layer is preferably 90% by weight or more, more preferably 92% by weight or more, and particularly preferably 95% by weight or more, and is preferably 99.9% by weight or less, more preferably 99% by weight or less, and particularly preferably 98% by weight or less. When the ratio of the cyclic olefin polymer is equal to or more than the lower limit value of the aforementioned range, the water absorption properties of the transparent resin layer can be reduced. When it is equal to or less than the upper limit value, the absorption of light at a wavelength of 9 μm to 11 μm can be increased, and cutting using carbon dioxide gas laser light can be facilitated.

The olefin resin layer may further contain an optional component, in addition to the cyclic olefin polymer. Examples of the optional component may include additives, such as a colorant for enhancing the susceptibility to laser light such as an ester compound, a dye, and a pigment; a fluorescent whitening agent; a dispersant; a thermal stabilizer; a light stabilizer; an ultraviolet ray absorber; an antistatic agent; an antioxidant; fine particles; and a surfactant. One type of these components may be solely used, and two or more types thereof may also be used in combination at any ratio.

The glass transition temperature of the cyclic olefin resin forming the olefin resin layer is preferably 100° C. or higher, more preferably 110° C. or higher, and particularly preferably 120° C. or higher, and is preferably 190° C. or lower, more preferably 180° C. or lower, and particularly preferably 170° C. or lower. When the glass transition temperature falls within the aforementioned range, the transparent resin layer having excellent durability can be easily produced. When it is equal to or less than the upper limit value thereof, molding can be easily performed.

[2.2.5. Thickness, Properties, and the Like of Transparent Resin Layer]

The thickness of the transparent resin layer is preferably 1 μm or more, more preferably 5 μm or more, and particularly preferably 10 μm or more, and is preferably 100 μm or less, more preferably 50 μm or less, and particularly preferably 30 μm or less. When the thickness of the transparent resin layer is equal to or more than the lower limit value of the aforementioned range, a capability of efficiently absorbing carbon dioxide gas laser light can be imparted to the transparent resin layer. When it is equal to or less than the upper limit value, the haze of the transparent resin layer can be decreased. Therefore, the transparency of the transparent resin layer can be improved.

Herein, that the transparent resin layer is "transparent" means that the transparent resin layer has a degree of light transmittance which is suitable for use in a polarizing plate. In the present invention, the entire transparent resin layer of one or more layers in the resin layer A may have a total light transmittance of 80% or more.

[2.2.6. Layer Configuration of Resin Layer A, Other Layers in Resin Layer A, and Formation Method]

In a preferable aspect, the resin layer A may have one layer of the polarizer layer and a pair of the transparent resin layers provided on front and back surfaces of the polarizer layer. Materials of the transparent resin layers of the front and back surfaces may be the same or different. The thicknesses of the transparent resin layers of the front and back surfaces may be the same or different.

In the layered body, the resin layer A usually has an area which is larger than that of the polarizing plate obtained as a product. The resin layer A may be cut into a size suitable for the polarizing plate as the product.

In addition to the polarizer layer and the transparent resin layer described above, the resin layer A may have an optional layer. For example, the resin layer A may include an adhesive layer for effecting adhesion of layers such as the polarizer layer and the transparent resin layer.

The method for providing the resin layer A on the support to obtain the layered body is not particularly limited, and any method may be adopted. In a preferable aspect, a multilayer film consisting of a plurality of layers constituting a part of or the entire resin layer A is prepared, and the resulting multilayer film is disposed on the support, to thereby obtain the layered body. In this case, although the multilayer film may be simply placed on the support, the multilayer film is usually bonded to the support. The bonding may be achieved through the adhesive layer. In this case, the resin layer A may also include the adhesive layer for the adhesion, in addition to the multilayer film.

The method for preparing the multilayer film is not particularly limited, and any method may be adopted. In a preferable aspect, a film constituting the polarizer layer and a film constituting the transparent resin layer are each prepared, and bonded together through an adhesive, to thereby prepare the multilayer film.

The adhesive used in the preparation of the multilayer film and bonding of the multilayer film to the support is not particularly limited, and an adhesive suitable for the bonding subject may be appropriately selected. Examples of a material constituting the preferable adhesive may include polymer materials, such as an acrylic polymer, a silicone-based polymer, polyester, polyurethane, polyether, a synthetic rubber, polyvinyl alcohol, and an epoxy resin. The adhesive may contain a known additive including a tackifying agent, such as a petroleum-based resin, a rosin-based resin, a terpene-based resin, a coumaroneindene resin, a phenolic resin, a xylene resin, and an alkyd resin, a softener, such as a phthalic acid ester, a phosphoric acid ester, paraffin chloride, polybutene, and polyisobutylene, and other various fillers and antiaging agents.

In particular, preferable examples of the adhesive may include an adhesive of an aqueous solution containing polyvinyl alcohol and a water-soluble epoxy resin. This adhesive may be particularly preferably used for adhesion of the olefin resin layer to the polarizer layer. Other preferable examples of the adhesive may include an UV adhesive which contains any of the aforementioned materials and if necessary, a photopolymerization initiator and may be cured by irradiation with an ultraviolet ray. This adhesive may be particularly preferably used for adhesion of the olefin resin layer to the support.

[3. Cutting Step]

The method for producing an optical film of the present invention includes a cutting step of performing irradiation with a laser light onto the layered body to cut the resin layer A of the layered body.

In the cutting step, irradiation with the laser light is performed such that the laser light has a flat energy distribution. A beam having a flat energy distribution is also referred to as a beam having a "top hat" profile.

Figure 1:
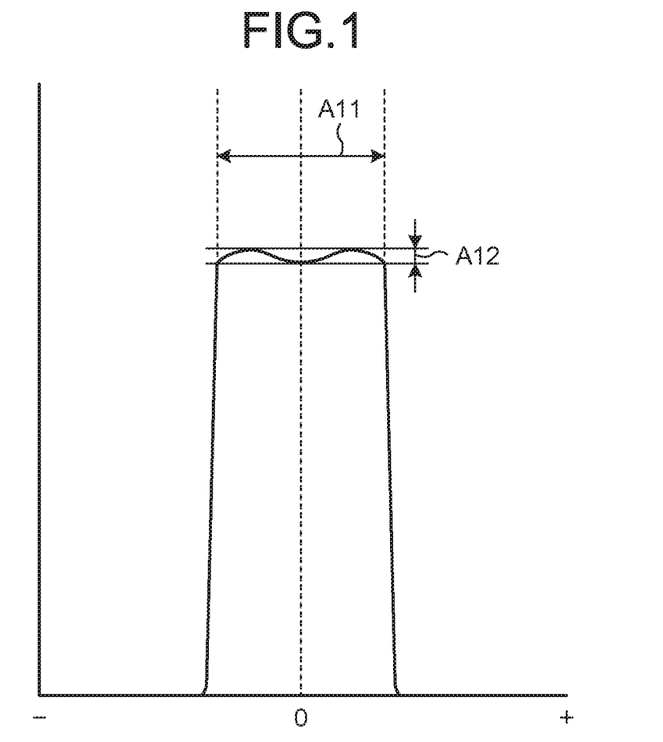
FIG. 1 is a graph showing an example of energy distribution of a beam of laser light having a flat energy distribution.

The energy distribution of the beam may be expressed by a graph in which the horizontal axis is a distance from an optical axis of the beam and the vertical axis is an energy amount at a position of the distance. An example of the flat energy distribution will be described with reference to FIG. 1. FIG. 1 is a graph showing an example of energy distribution of a beam of laser light having a flat energy distribution. The horizontal axis of FIG. 1 represents a distance from an optical axis of the beam of the laser light where a distance at an azimuth angle is represented as positive, and a distance at an angle opposite to the azimuth angle is represented as negative. The vertical axis of FIG. 1 represents an energy amount of the laser light at a position of the distance. In the example shown in FIG. 1, the energy distribution has a flat shape in a width shown by an arrow A11. A laser light having such a flat energy distribution at least at one direction may be used in the cutting step. For example, a beam having a flat energy distribution at all azimuth angles in a cross section orthogonal to the optical axis of the beam may be used, and a beam having a top hat-shaped energy distribution in a long axis direction of the cross section of the beam and a Gaussian distribution in a short axis direction may also be used.

Figure 2:
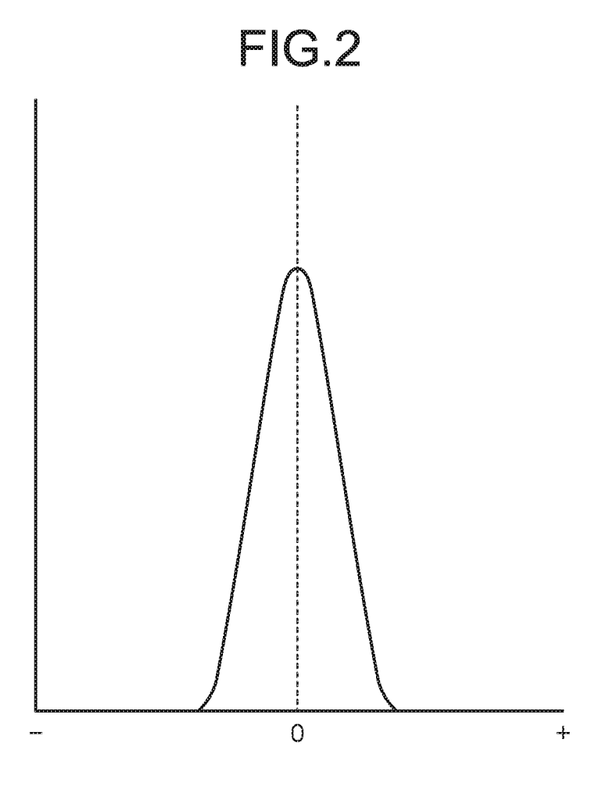
FIG. 2 is a graph showing an example of energy distribution of a beam of laser light in a Gaussian mode which is used generally used in prior art.

FIG. 2 is a graph showing an example of energy distribution of a beam of laser light in a Gaussian mode which is generally used in prior art. In the example shown in FIG. 2, the energy distribution has a shape which does not have a flat portion.

In the method for producing an optical film of the present invention, fluctuation of energy amount at a flat region (corresponding to an arrow A12 of FIG. 1) is preferably within a range of ±10%, more preferably ±7%, and further preferably ±64 relative to the average energy amount at the flat region. When laser light having such an energy distribution is used, the resin layer A can be surely cut while damage to the support is decreased.

Such a beam having a flat energy distribution may be obtained by converting the energy distribution through a beam shaper which is disposed on a route of a general beam emitted in a Gaussian mode or a mode similar to the Gaussian mode. Examples of the beam shaper may include a shaper in which an incident beam is shaped by refraction, diffraction, reflection, or a combination thereof and the energy distribution in the beam is redistributed. Specific examples of the beam shaper may include a known beam shaper, for example, beam shapers described in Patent Literatures 1 and 2, and a commercially available shaper that converts a Gaussian beam into a beam having a flat energy distribution at least at one direction (for example, top hat module manufactured by DAICO MFG CO., Ltd.).

The irradiation with the laser light is usually performed from a region of the layered body on the side of the resin layer A. Therefore, the surface of the layered body on the side of the resin layer A is a surface where the laser light is received.

According to a feature of the present invention, the irradiation with the laser light is performed such that a distance between a focus of the laser light and a receiving point of the laser light on the surface of the resin layer A where the laser light is received falls within a specific range. This requirement will be described with reference to FIG. 3.

Figure 3:
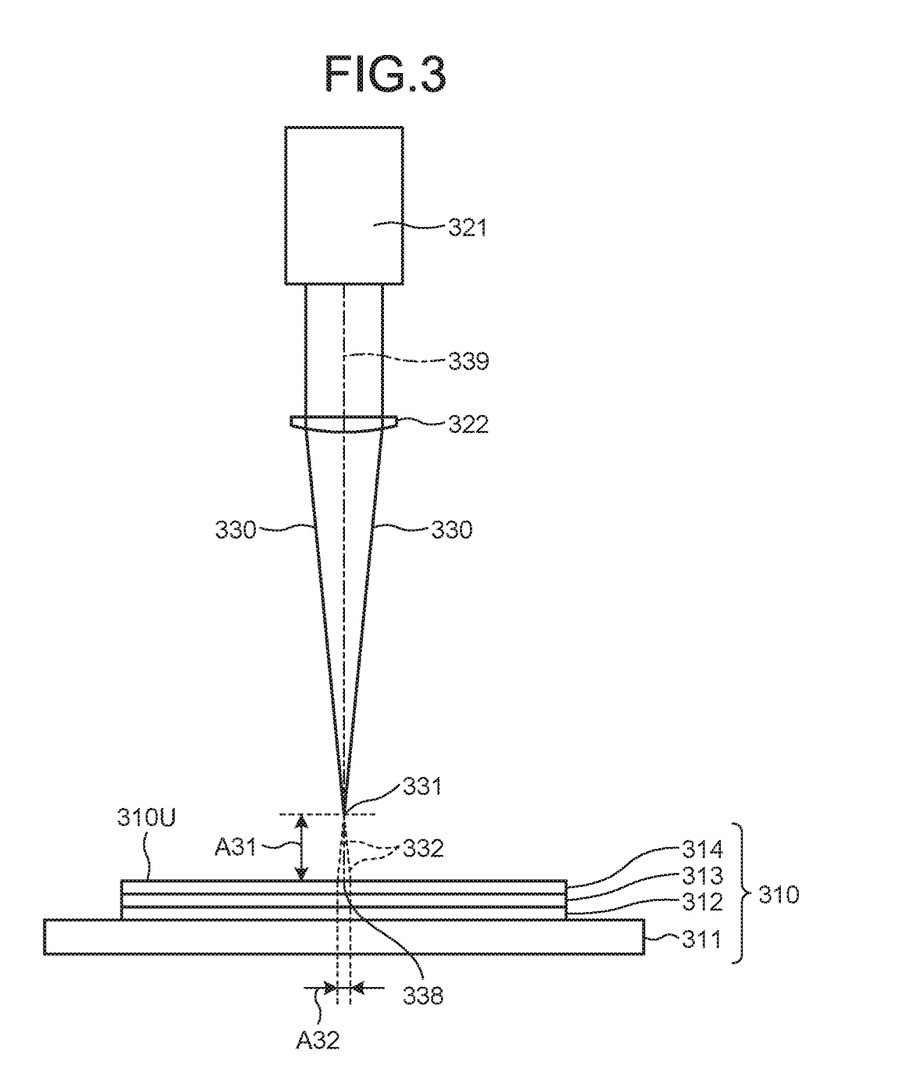
FIG. 3 is a side view illustrating an example of a positional relationship between a layered body and laser light in a cutting step in the method for producing an optical film of the present invention.

FIG. 3 is a side view illustrating an example of a positional relationship between the layered body and the laser light in the cutting step in the method for producing an optical film of the present invention. In the example shown in FIG. 3, laser light is emitted orthogonally downward from a laser light irradiation device 321, and the laser light in a direction orthogonal to a surface 310U of a layered body 310 on a resin layer A side, which is horizontally placed, is received by the surface 310U.

Unless otherwise specified, the description of the positional relationship of each member in the cutting step will be described below as a positional relationship in which the layered body is horizontally placed with the support facing downward and the resin layer A facing upward and is irradiated with laser light from above, as in the example shown in FIG. 3. However, an actual cutting step is not limited to this description. The cutting step may be performed by placing the layered body in any orientation and irradiating the layered body with laser light from any appropriate direction.

In the example shown in FIG. 3, the layered body 310 has a support 311, a polarizer protective layer 312, a polarizer layer 313, and a polarizer protective layer 314, and adhesive layers (not shown) interposed between the layers. The layers other than the support 311 in the layered body 310 constitute the resin layer A. On the other hand, an outer extension of a bundle of light rays of the laser light is represented by lines 330, and an optical axis of the laser light is represented by a line 339. The laser light emitted from the laser light irradiation device 321 is converted into a beam having a flat energy distribution and condensed by a beam shaper 322, and as a result, a focus 331 is obtained above the surface 310U of the resin layer A where the laser light is received.

In the example shown in FIG. 3, a distance between the focus 331 of the laser light and the surface 310U is a distance shown by an arrow A31. The laser light is a bundle of light rays which expands as shown by dotted lines 332 at a region below the focus, and irradiation is performed at a range of an area in the surface 310U. The receiving point of the laser light in the surface 310U is defined as a point 338 in which the optical axis 339 of the laser light and the surface 310U cross each other. In the method for producing an optical film of the present invention, irradiation is performed such that the distance between the focus and the receiving point is 0.1 mm or more, and preferably 0.2 mm or more, and is 1 mm or less, and preferably 0.5 mm or less. The inventor has found that when the irradiation is performed such that the laser light is brought into focus at such a specific position, the resin layer A can be surely cut while damage to the support is decreased. On the other hand, when the distance between the focus and the surface is 0 mm or more and less than 0.1 mm, irradiation with laser light having an energy necessary for cutting of the resin layer A tends to cause damage to the support. As a result, the cutting step cannot be smoothly performed. When the laser light is brought into focus at a position below the surface, a larger amount of energy is concentrated on the support. As a result, this case also tends to cause damage to the support.

It is preferable that an irradiation angle of the laser light (angle between the optical axis 339 of the laser light and the surface 310U) is in an orthogonal direction for obtaining a good cut surface with small deformation of the cut surface of the resin layer. However, the irradiation angle is not limited to this angle, and may be an angle within a range of preferably 0° to 2°, and more preferably 0° to 1° relative to the orthogonal direction.

As the laser device used in the cutting step, a variety of types of laser device usable in processing of a film may be used. Examples of the usable laser device may include an ArF excimer laser device, a KrF excimer laser device, a XeCl excimer laser device, a YAG laser device (in particular, of a third or fourth harmonic), a YLF or YVO4 solid state laser device (in particular, of a third or fourth harmonic), a Ti:S laser device, a semiconductor laser device, a fiber laser device, and a carbon dioxide gas laser device. Among the laser devices, a carbon dioxide gas laser device is preferable since the device is relatively inexpensive and an output suitable for processing of a film can be efficiently obtained.

The wavelength of laser light emitted from the laser device in the cutting step is not particularly limited, and may be any wavelength usable in processing of a film. For example, laser light having a wavelength within a range of 9 μm or more and 12 μm or less may be used. Laser light having a wavelength of 9 μm or more and 9.5 μm or less can be stably emitted when a carbon dioxide gas laser device is used as the laser device, and therewith the production method of the present invention can be particularly favorably performed.

The output P of the laser light is preferably 1 W or more, more preferably 5 W or more, and further preferably 15 W or more, and is preferably 400 W or less, more preferably 350 W or less, further preferably 300 W or less, yet further preferably 250 W or less, and particularly preferably 120 W or less. When the output P of the laser light is equal to or more than the lower limit value of the aforementioned range, insufficiency in irradiation dose of the laser light can be prevented, and the cutting step can be stably performed. When the output P of the laser light is equal to or less than the upper limit value of the aforementioned range, undesired deformation of the film and damage to the support can be suppressed.

The laser light may be continuous laser light, and may also be pulsed laser light. Of these, pulsed laser light is preferable. When the pulsed laser light is used, processing can be performed with suppressed heat generation.

When pulsed laser light is used, the frequency of the laser light is preferably 10 kHz or more, more preferably 15 kHz or more, and particularly preferably 20 kHz or more, and is preferably 300 kHz or less, more preferably 200 kHz or less, yet further preferably 150 kHz or less, and particularly preferably 80 kHz or less. When the frequency of the pulsed laser light is equal to or more than the lower limit value of the aforementioned range, the processing speed can be increased. When it is equal to or less than the upper limit value thereof, processing can be performed with suppressed effects of heat.

When the pulsed laser light is used, the range of pulse width is preferably 10 nanoseconds or more, more preferably 12 nanoseconds or more, and particularly preferably 15 nanoseconds or more, and is preferably 30 nanoseconds or less, more preferably 28 nanoseconds or less, and particularly preferably 25 nanoseconds or less. When the pulse width of the pulsed laser light is equal to or more than the lower limit value of the aforementioned range, the processing speed can be increased. When it is equal to or less than the upper limit value thereof, processing can be performed with suppressed effects of heat.

In the cutting step, the resin layer A is usually irradiated with the laser light such that the surface of the resin layer A is scanned along a desired line with the laser light. Thus, a point at which the laser light impinges on the resin layer A is moved along the desired line on the surface of the resin layer A. As a result, the resin layer A can be cut into a desired cut shape. Scanning of the laser light on the surface of the resin layer A may be performed by moving the laser light irradiation device, moving the resin layer A, or moving both the laser light and the resin layer A.

The scanning speed, that is, the movement speed of the point at which the laser light impinges on the resin layer A during movement on the surface of the resin layer A may be appropriately set depending on conditions such as the output P of the laser light and the thickness of the resin layer A. Specifically, the range of the scanning speed V is preferably 5 mm/s or more, more preferably 10 mm/s or more, and particularly preferably 20 mm/s or more, and is preferably 4,000 mm/s or less, more preferably 3,000 mm/s or less, further preferably 2,000 mm/s or less, and particularly preferably 1,500 mm/s or less. When the scanning speed V is equal to or more than the lower limit value of the aforementioned range, heat generation can be suppressed and a good cut surface can be obtained. When it is equal to or less than the upper limit value thereof, the number of scanning with the laser light can be decreased and cutting can be efficiently performed.

According to a feature of the present invention, the irradiation with the laser light is performed such that the ratio P/V of the output P (unit: W) of the laser light relative to the scanning speed V (unit: mm/s) falls within a specific range.

The value of P/V is 0.10 or more, and preferably 0.15 or more, and is 0.25 or less, and preferably 0.20 or less. When the irradiation with such laser light is performed in the cutting step, the resin layer can be smoothly cut without causing damage to the support.

When the resin layer A is irradiated with the laser light to cut the resin layer A along a line, the number of scanning with the laser light along the line may be one or two or more. When the resin layer is cut by one scanning operation, the period of time required for the cutting step can be shortened. When the scanning is performed twice or more, heat generated in the resin layer A per one irradiation with the laser light can be decreased. Therefore, the width of a laser treatment-influencing portion can be further decreased.

When the laser light having a flat energy distribution only in one direction is used as the laser light, it is preferable that scanning is performed with the laser light in a direction orthogonal to the direction in the cutting step, because a precisely controlled cut surface can thereby be obtained.

[4. Step after Cutting Step]

In the method for producing an optical film of the present invention, an optional step may be performed after the cutting step. For example, a step wherein a part of or all of the resin layer A which has become a plurality of film pieces as a result of the cutting step is removed from the support may be performed. During removal, all layers of the resin layer A may be removed from the support, or only a part of the layers may be removed from the rest. The film piece of the resin layer A obtained by removal as it is may be used as the product optical film such as a polarizing plate. If necessary, the film piece may be subjected to an optional step such as bonding to another optional layer before being used as the product. The layer configuration of the polarizing plate is not particularly limited, and for example, may be a layer configuration including one polarizer layer, a pair of transparent resin layers provided on front and back surfaces of the polarizer layer, and adhesive layers interposed between the layers. The layered body of the cut film piece of the resin layer A and the support as it is may also be incorporated in a display device as a layered body combining the product polarizing plate with the support.

The application of an optical film obtained by the production method of the present invention is not limited, and may be an application as a polarizing plate and may also be any other optical applications. This optical film may be used alone, and may also be used in combination with another optional member. For example, the optical film may be integrated with a display device such as a liquid crystal display device, an organic electroluminescent display device, a plasma display device, an FED (field emission display) device, and an SED (surface field emission display) device, for use.

For example, the optical film of the film piece obtained by the method for producing an optical film of the present invention may be used as a protective film for a polarizer, and bonded to another polarizer layer to form a polarizing plate.

For example, the obtained film piece may be combined as a phase difference film with a circularly polarizing film to obtain a brightness enhancement film.

EXAMPLES

Hereinafter, the present invention will be specifically described with reference to Examples. However, the present invention is not limited to the following Examples. The present invention may be freely modified and practiced without departing from the scope of claims of the present invention and the scope of their equivalents.

Unless otherwise specified, "%" and "part" that represent an amount in the following description are on the basis of weight. Unless otherwise specified, operations described below were performed under conditions of normal temperature and normal pressure.

Production Example 1 (Production of Cyclic Olefin Resin)

(Ring-Opening Polymerization Step)

A monomer mixture containing dicyclopentadiene, tetracyclododecene, and methanotetrahydrofluorene at a ratio by weight of 60/35/5 was prepared.

In a reaction vessel inside of which is replaced with nitrogen, 7 parts of the monomer mixture described above (1% by weight relative to the total amount of monomers used in the polymerization) and 1,600 parts of cyclohexane were placed, and 0.55 parts of tri-i-butylaluminum, 0.21 parts of isobutyl alcohol, 0.84 parts of diisopropyl ether as a reaction modifier, and 3.24 parts of 1-hexene as a molecular weight modifier were further added.

To the mixture, 24.1 parts of a tungsten hexachloride solution with a concentration of 0.65% in cyclohexane was added, and the mixture was stirred at 55° C. for 10 minutes.

Subsequently, while the reaction system was held at 55° C., 693 parts of the monomer mixture and 48.9 parts of the tungsten hexachloride solution with a concentration 0.65% in cyclohexane were each continuously added dropwise to the system over 150 minutes.

After that, the reaction was continued for 30 minutes, and the polymerization was then terminated to obtain a ring-opening polymerization reaction liquid containing a ring-opened polymer. After completion of the polymerization, the polymerization conversion ratio of the monomers measured by gas chromatography at the completion of the polymerization was 100%.

(Hydrogenation Step)

The obtained ring-opening polymerization reaction liquid was transferred to a hydrogenation reaction vessel, and 1.4 parts of a diatomaceous earth-supported nickel catalyst ("T8400RL" available from Nikki Chemical Co., Ltd., nickel supporting ratio: 57%) and 167 parts of cyclohexane were added. The mixture was reacted at 180° C. and a hydrogen pressure of 4.6 MPa for 6 hours to obtain a reaction solution. The reaction solution was subjected to pressurized filtration through RADIOLITE #500 as a filter bed under a pressure 0.25 MPa (product name "FUNDA Filter" available from IHI Corporation) to remove the hydrogenation catalyst. Thus, a colorless transparent hydrogenated product solution containing a hydrogenated product of the ring-opened polymer was obtained.

(Filtration Step)

Subsequently, this hydrogenated product solution was successively filtrated through filters ("Zetaplus filter 30H" available from CUNO, pore diameter: 0.5 μm to 1 μm), and then further filtrated through another filter made of metal fibers (available from NICHIDAI CORPORATION, pore diameter: 0.4 μm), to remove a fine solid content from the hydrogenated product solution.

(Drying Step and Molding Step)

This hydrogenated product solution was dried using a cylindrical concentrating and drying device (manufactured by Hitachi, Ltd.) at a temperature of 270° C. and a pressure of 1 kPa or less. As a result, the solvent cyclohexane and other volatile components were removed from the hydrogenated product solution, to obtain a resin solid content. This resin solid content in a melted state was extruded from a die directly connected to the aforementioned concentrating and drying device, to be in a strand shape. The extruded resin solid content was cooled, and cut using a pelletizer, to obtain a pellet-shaped cyclic olefin resin containing the hydrogenated product of the ring-opened polymer.

Example 1

(1-1. Cyclic Olefin Resin Film)

A hanger manifold-type T-die film melt extrusion molding device equipped with a screw having a screw diameter of 20 mm, a compression ratio of 3.1, and L/D of 30 (stationary, manufactured by GSI Creos Corporation) was prepared.

The cyclic olefin resin produced in Production Example 1 was molded into a film shape using the film melt extrusion molding device, to obtain a cyclic olefin resin film having a thickness of 0.02 mm. Conditions during the molding were a die lip of 0.8 mm, a T-die width of 300 mm, a melt resin temperature of 260° C., and a cooling roller temperature of 110° C.

(1-2. Multilayer Film)

A polarizer layer formed from a film having a thickness of 25 μm in which iodine was adsorbed and oriented in polyvinyl alcohol was prepared. To one surface of the polarizer layer, a polarizer protective film formed from a TAC (triacetyl cellulose) film having a thickness of 80 μm was bonded using an adhesive. As the adhesive, an aqueous solution containing polyvinyl alcohol and a water-soluble epoxy resin was used.

To another surface of the polarizer layer, the cyclic olefin resin film obtained in (1-1) was bonded using an adhesive. As the adhesive, an aqueous solution containing polyvinyl alcohol and a water-soluble epoxy resin was used.

Thus, a multilayer film having a thickness of about 200 μm and a layer configuration of (TAC film)/(adhesive layer)/(polarizer layer)/(adhesive layer)/(cyclic olefin resin layer) was obtained.

(1-3. Layered Body)

The multilayer film obtained in (1-2) was bonded to one surface of a glass plate (thickness: 0.7 mm) as a support using an adhesive. As the adhesive, an aqueous solution containing polyvinyl alcohol and a water-soluble epoxy resin was used. Thus, a layered body having a layer configuration of (TAC film layer)/(adhesive layer)/(polarizer layer)/(adhesive layer)/(cyclic olefin resin layer)/(adhesive layer)/(glass plate) was obtained. Among these layers, the layer configuration of (TAC film layer)/(adhesive layer)/(polarizer layer)/(adhesive layer)/(cyclic olefin resin layer)/(adhesive layer) corresponds to the resin layer A.

(1-4. Cutting Step)

A surface of the layered body obtained in (1-3) on a side of the multilayer film was orthogonally irradiated with carbon dioxide gas laser light having a wavelength of 9.4 μm by a laser light irradiation device (DIAMOND E-250i (manufactured by Coherent)), to cut the resin layer A. The output P of the laser light was adjusted to 100 W. As the laser light for irradiation, pulsed laser light in which irradiation and cessation were repeated at a cycle of frequency of 20 kHz was employed. The laser light which was emitted from the irradiation device and was a parallel light ray having a Gaussian distribution was shaped by a beam shaper provided with a DOE (diffraction optical element), whereby the energy distribution of the beam of the laser light was made into a flat shape which is substantially uniform in a surface direction orthogonal to the optical axis, and collected. The position of a focus of the laser light was adjusted such that the distance between the focus and the receiving point of the laser light on a top surface of the resin layer A was 0.2 mm. On the surface of the resin layer A, the irradiation position of the laser light was moved, to perform cutting of the resin layer A in a scanning manner. The scanning speed V was 500 mm/s, and the number of scanning was one.

(1-5. Evaluation)

The layered body after the cutting step was observed and evaluated. As a result, it was observed that only the resin layer A was completely cut and no crack in the support was created.

Example 2

(2-1. Multilayer Film)

A polarizer layer formed from a film having a thickness of 25 μm in which iodine was adsorbed and oriented in polyvinyl alcohol was prepared. To one surface of the polarizer layer, the cyclic olefin resin film obtained in (1-1) of Example 1 was bonded using an adhesive. As the adhesive, an aqueous solution containing polyvinyl alcohol and a water-soluble epoxy resin was used.

To another surface of the polarizer layer, the cyclic olefin resin film obtained in (1-1) of Example 1 was bonded using an adhesive. As the adhesive, an aqueous solution containing polyvinyl alcohol and a water-soluble epoxy resin was used.

Thus, a multilayer film having a thickness of about 200 μm and a layer configuration of (cyclic olefin resin layer)/(adhesive layer)/(polarizer layer)/(adhesive layer)/(cyclic olefin resin layer) was obtained.

(2-2. Layered Body)

The multilayer film obtained in (2-1) was bonded to one surface of a glass plate (thickness: 0.7 mm) as a support using an adhesive. As the adhesive, an aqueous solution containing polyvinyl alcohol and a water-soluble epoxy resin was used as the adhesive. Thus, a layered body having a layer configuration of (cyclic olefin resin layer)/(adhesive layer)/(polarizer layer)/(adhesive layer)/(cyclic olefin resin layer)/(adhesive layer)/(glass plate) was obtained. Among the layers, the layer configuration of (cyclic olefin resin layer)/(adhesive layer)/(polarizer layer)/(adhesive layer)/(cyclic olefin resin layer)/(adhesive layer) corresponds to the resin layer A.

(2-3. Cutting Step and Evaluation)

The cutting step and evaluation were performed in the same manner as in (1-4) and (1-5) of Example 1 except that the layered body obtained in (2-2) was used in place of the layered body obtained in (1-3). As a result, it was observed that only the resin layer A was cut and no crack in the support was created.

Example 3

A layered body was formed, cut, and evaluated in the same manner as in Example 1 except that the output wavelength of the laser light irradiation device was changed to 10.6 μm in the cutting step of (1-4). As a result, it was observed that, although the resin layer A was cut, a shallow crack was created on the support and the cutting thus gave slight damage to the support. However the damage was in a range of allowable degree.

Example 4

A layered body was formed, cut, and evaluated in the same manner as in Example 1 except that the position of focus of the laser light was adjusted such that the distance between the focus and the receiving point of the laser light was 0.5 mm in the cutting step of (1-4). As a result, it was observed that only the resin layer A was cut and no crack in the support was created.

Example 5

A layered body was formed, cut, and evaluated in the same manner as in Example 1 except that the position of focus of the laser light was adjusted such that the distance between the focus and the receiving point of the laser light was 0 mm in the cutting step of (1-4). As a result, it was observed that only the resin layer A was cut and no crack in the support was created.

Example 6

A layered body was formed, cut, and evaluated in the same manner as in Example 1 except that the output of the laser light was changed to 125 W and the value of P/V was changed to 0.25 in the cutting step of (1-4). As a result, it was observed that only the resin layer A was cut and no crack in the support was created.

Comparative Example 1

A layered body was formed, cut, and evaluated in the same manner as in Example 1 except that the laser light was not shaped by a shaper in the cutting step of (1-4) and thus the energy distribution of the laser light had a Gaussian distribution profile. As a result, it was observed that, although the resin layer A was cut, a deep crack was created on the support and the cutting thus gave damage to a large extent whereby the support was unable to be reused.

Comparative Example 2

A layered body was formed, cut, and evaluated in the same manner as in Example 1 except that the position of focus of the laser light was adjusted such that the distance between the focus and the receiving point of the laser light was 1.2 mm in the cutting step of (1-4). As a result, it was unable to cut the resin layer A.

The outlines of Examples and Comparative Examples are summarized in the following Tables 1 and 2.

TABLE 1

|  | Ex. 1 | Ex. 2 | Ex. 3 | Ex. 4 |
| --- | --- | --- | --- | --- |
| Laser light wavelength | 9.4 μm | 9.4 μm | 10.6 μm | 9.4 μm |
| Configuration of layered body[1] | TAC/PVA/ COP/glass plate | COP/PVA/ COP/glass plate | TAC/PVA/ COP/glass plate | TAC/PVA/ COP/glass plate |
| Focus-resin layer A surface distance (mm) | 0.2 | 0.2 | 0.2 | 0.5 |
| Laser light shape | Flat | Flat | Flat | Flat |
| P(W)/V (mm/s) | 0.2 | 0.2 | 0.2 | 0.2 |
| Evaluation | | | | |
| Resin layer A cutting | G | G | G | G |
| Support crack | A | A | B | A |

TABLE 2

|  | Ex. 5 | Ex. 6 | Comp. Ex. 1 | Comp. Ex. 2 |
| --- | --- | --- | --- | --- |
| Laser light wavelength | 9.4 μm | 9.4 μm | 9.4 μm | 9.4 μm |
| Configuration of layered body[1] | TAC/PVA/ COP/glass plate | TAC/PVA/ COP/glass plate | TAC/PVA/ COP/glass plate | TAC/PVA/ COP/glass plate |
| Focus-resin layer A surface distance (mm) | 0 | 0.2 | 0.2 | 1.2 |
| Laser light shape | Flat | Flat | Gaussian | Flat |
| P(W)/V (mm/s) | 0.2 | 0.25 | 0.2 | 0.2 |
| Evaluation | | | | |
| Resin layer A cutting | G | G | G | NG |
| Support crack | A | A | A | — |

1) The layer configuration of the layered body is shown wherein the adhesive is omitted. TAC: layer of triacetyl cellulose film, PVA: polarizer layer, COP: cyclic olefin resin layer Meanings of the abbreviations in evaluation are as follows.
G: cutting of the resin layer A was successful.
NG: cutting of the resin layer A was unsuccessful.
A: no crack was created on the support.
B: shallow crack was created on the support.
C: crack was created on the support.

As shown from the results in Table 1, the resin layer A was successfully cut in a state where the support was less damaged in Examples 1 to 4 in which the distance between the focus of the laser light having a flat energy distribution and the surface of the resin layer A was set within a specific range and in Examples 5 and 6 in which the ratio P/V of the output P of the laser light having a flat energy distribution relative to the scanning speed V was set within a specific range. In contrast, in a case where laser light that did not have flat energy distribution was used as the laser light (Comparative Example 1), the support was largely damaged, and in a case where the distance between the focus and the surface of the resin layer A was out of the specific range (Comparative Example 2), it was unable to cut the resin layer A.

REFERENCE SIGNS LIST

321: laser light irradiation device
310: layered body
310U: surface on the side of the resin layer A
311: support
312: polarizer protective layer
313: polarizer layer
314: polarizer protective layer
330: outer extension of a bundle of light rays of the laser light
338: receiving point of the laser light
339: optical axis of bundle of light rays of the laser light
322: beam shaper
331: focus

The invention claimed is:
1. A method for producing an optical film comprising a cutting step of performing irradiation with a laser light onto a layered body having a support and a resin layer provided on the support to cut the resin layer, wherein in the cutting step, the irradiation with the laser light is performed such that
a beam of the laser light has a flat energy distribution, and
a distance between a focus of the laser light and a receiving point of the laser light on a surface of the resin layer where the laser light is received is 0.1 to 1 mm.

2. The method for producing an optical film according to claim 1, wherein in the cutting step, the irradiation with the laser light is performed such that a ratio P/V of an output P (W) of the laser light relative to a scanning speed V (mm/s) is 0.10 or more and 0.25 or less.

3. The method for producing an optical film according to claim 1, wherein the laser light has a wavelength of 9 μm or more and 9.5 μm or less.

4. The method for producing an optical film according to claim 1, wherein the resin layer contains one or more cyclic olefin resin layers.

5. The method for producing an optical film according to claim 1, wherein the resin layer contains one or more polarizer layers.

* * * * *